US012640993B2

(12) United States Patent
Bethamsetty et al.

(10) Patent No.: US 12,640,993 B2
(45) Date of Patent: May 26, 2026

(54) ADAPTIVE NOISE REDUCTION OF STREAMING NETWORK DATA

(71) Applicant: T-Mobile USA, Inc., Bellevue, WA (US)

(72) Inventors: Sridhar Bethamsetty, Frisco, TX (US); Vikas Ranjan, Bellevue, WA (US); Diglio Antonio Simoni, Raleigh, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 35 days.

(21) Appl. No.: 18/592,237

(22) Filed: Feb. 29, 2024

(65) Prior Publication Data

US 2025/0279940 A1 Sep. 4, 2025

(51) Int. Cl.
H04L 41/16 (2022.01)
H04L 43/0876 (2022.01)

(52) U.S. Cl.
CPC .......... H04L 41/16 (2013.01); H04L 43/0876 (2013.01)

(58) Field of Classification Search
None
See application file for complete search history.

(56) References Cited

U.S. PATENT DOCUMENTS

| | | | |
|---|---|---|---|
| 6,636,987 | B1 | 10/2003 | Ruffini |
| 8,166,351 | B2 | 4/2012 | Slutsman et al. |
| 9,996,749 | B2 | 6/2018 | Bataller et al. |
| 10,007,849 | B2 | 6/2018 | Bataller et al. |
| 10,373,065 | B2 | 8/2019 | Suleiman et al. |
| 10,476,896 | B2 | 11/2019 | Divalentin et al. |
| 10,545,638 | B2 | 1/2020 | Ayzenshtat et al. |
| 10,601,688 | B2 | 3/2020 | Abdulnour et al. |
| 10,685,332 | B2 | 6/2020 | Ilan et al. |
| 10,708,122 | B1 | 7/2020 | Liu et al. |
| 10,928,817 | B2 | 2/2021 | Spiro et al. |
| 11,153,144 | B2 | 10/2021 | Sasidharan et al. |
| 11,169,288 | B1 | 11/2021 | Johnson et al. |
| 11,256,562 | B2 | 2/2022 | Das et al. |
| 11,323,460 | B2 | 5/2022 | Divalentin et al. |

(Continued)

FOREIGN PATENT DOCUMENTS

| | | |
|---|---|---|
| CN | 113474868 A | 10/2021 |
| CN | 113906280 A | 1/2022 |

(Continued)

*Primary Examiner* — June Sison
(74) *Attorney, Agent, or Firm* — Perkins Coie LLP

(57) ABSTRACT

Systems and methods for identifying correlations for adaptive noise reduction. The system obtains a set of network performance metrics measured during a period of time from a sensor module communicatively coupled to a set of sensors deployed at remote devices. The system may input the set of network performance metrics into a trained model to obtain an optimal set of network performance metrics to be measured during a next period of time, wherein the model is configured to determine a next set of metrics to be measured based on a previous set of metrics. The system identifies a second set of sensors for usage and may generate one or more commands configured to effectuate activation of one or more sensors of the second set of sensors, and deactivation of one or more sensors of the first set of sensors.

20 Claims, 7 Drawing Sheets

(56)     References Cited

U.S. PATENT DOCUMENTS

| | | | |
|---|---|---|---|
| 11,341,410 B1 | 5/2022 | Johnson et al. | |
| 11,493,913 B2 | 11/2022 | Shukla et al. | |
| 11,507,183 B2 | 11/2022 | Manjunath et al. | |
| 11,570,038 B2 | 1/2023 | Wang et al. | |
| 11,680,977 B2 | 6/2023 | Sun | |
| 2019/0102693 A1 | 4/2019 | Yates et al. | |
| 2019/0215230 A1 | 7/2019 | Mermoud et al. | |
| 2020/0205081 A1* | 6/2020 | Garg | H04W 4/70 |
| 2021/0351973 A1* | 11/2021 | Ford | H04L 43/067 |
| 2022/0076848 A1 | 3/2022 | Garg et al. | |
| 2023/0071271 A1 | 3/2023 | Chelminski | |
| 2023/0222002 A1* | 7/2023 | Akinapelli | G06F 9/505 |
| | | | 709/226 |
| 2024/0056842 A1* | 2/2024 | Masood | H04W 24/08 |
| 2024/0137285 A1* | 4/2024 | Lukens | H04L 41/5032 |

FOREIGN PATENT DOCUMENTS

| | | | |
|---|---|---|---|
| EP | 2256319 B1 | 5/2019 | |
| EP | 3663919 B1 | 9/2021 | |
| EP | 3889716 A1 | 10/2021 | |
| WO | 0120828 A1 | 3/2001 | |
| WO | 2015091785 A1 | 6/2015 | |
| WO | 2017055073 A1 | 4/2017 | |
| WO | 2017222693 A1 | 12/2017 | |
| WO | 2018075400 A1 | 4/2018 | |
| WO | 2019185657 A1 | 10/2019 | |
| WO | 2019185659 A1 | 10/2019 | |
| WO | 2021108796 A2 | 6/2021 | |

* cited by examiner

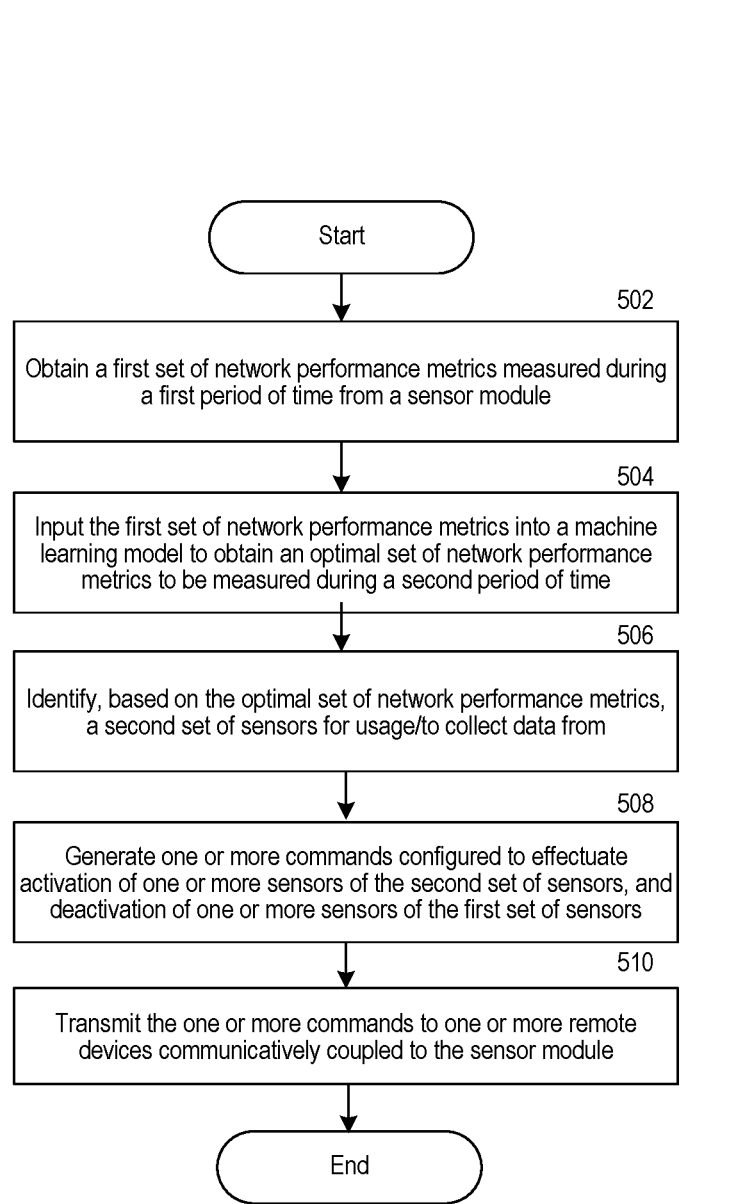

500

Start

502

Obtain a first set of network performance metrics measured during a first period of time from a sensor module

504

Input the first set of network performance metrics into a machine learning model to obtain an optimal set of network performance metrics to be measured during a second period of time

506

Identify, based on the optimal set of network performance metrics, a second set of sensors for usage/to collect data from

508

Generate one or more commands configured to effectuate activation of one or more sensors of the second set of sensors, and deactivation of one or more sensors of the first set of sensors

510

Transmit the one or more commands to one or more remote devices communicatively coupled to the sensor module End

Processor 602

Instructions
604

Main Memory 606

Instructions
608

Non-Volatile Memory 610

Network Interface Device 612

Network
614

Bus
616

Display Device 618

Input/Output Device 620

Control Device 622

Drive Unit 624

Machine-Readable (Storage)
Medium 626

Instructions
628

Signal Generation Device 630

ADAPTIVE NOISE REDUCTION OF STREAMING NETWORK DATA

BACKGROUND

A telecommunications network is established via a complex arrangement and configuration of many cell sites that are deployed across a geographical area. For example, there can be different types of cell sites (e.g., macro cells, microcells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

The surge in remote device usage has led to a substantial increase in the volume of network data being generated and stored. This data encompasses a wide range of metrics such as Key performance Indicators (KPIs) and various network parameters, which are crucial for monitoring and optimizing device performance. However, this escalation in data accumulation is not without its challenges. Storing such large amounts of data demands significant storage resources (e.g., servers), which can be costly. Moreover, the computational cost of processing this data is equally substantial. Analyzing and extracting meaningful insights from these large datasets requires advanced computing power and sophisticated algorithms, further adding to overall expense. Both entities and individuals face the negative consequences of maintaining and processing large-scale data, such as a lack in efficiency.

BRIEF DESCRIPTION OF THE DRAWINGS

Detailed descriptions of implementations of the present invention will be described and explained through the use of the accompanying drawings.

FIG. 5 is a flow diagram illustrating a process for identifying correlations for adaptive noise reduction.

Figure 1:
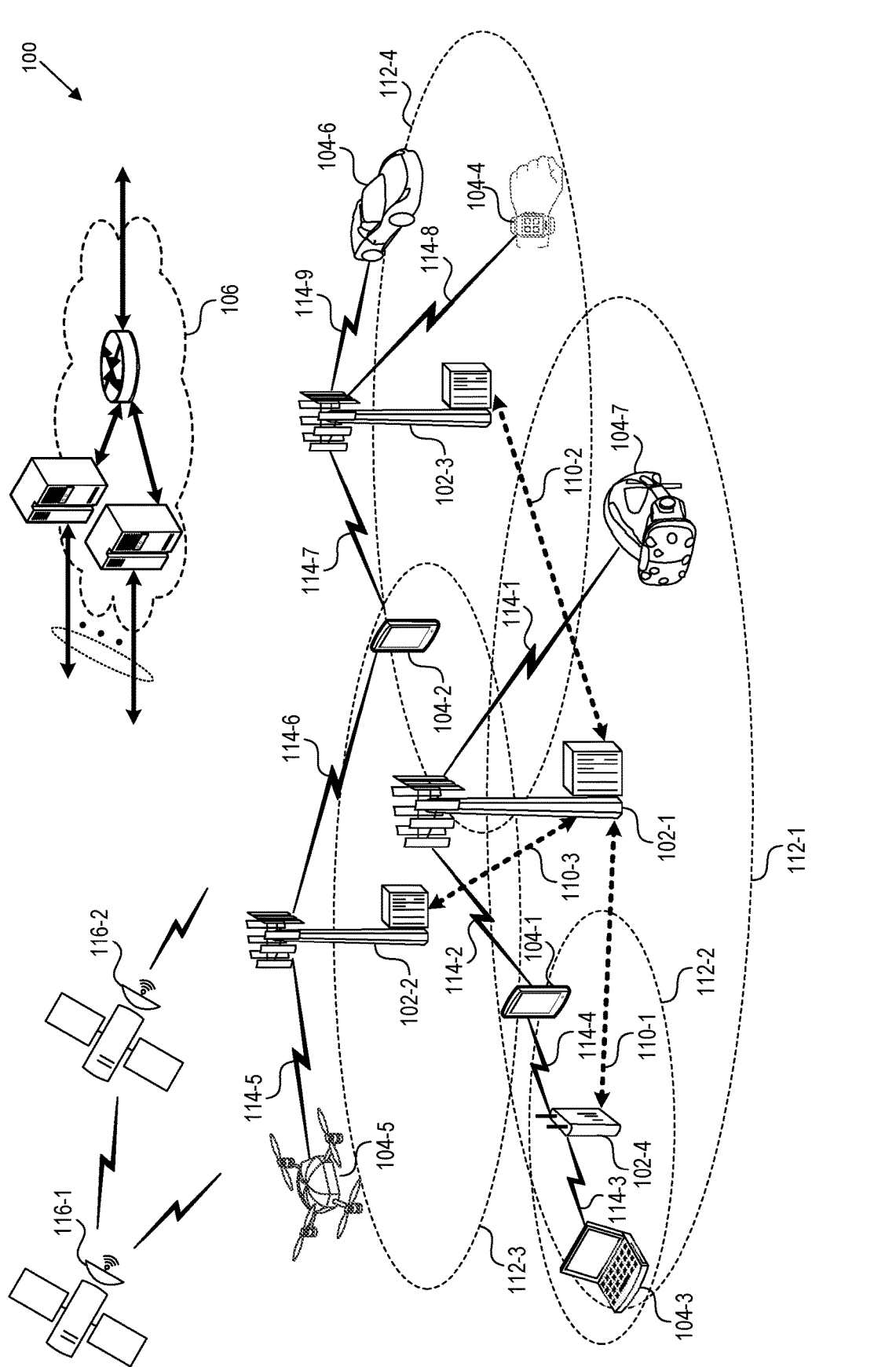
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The growth in remote device usage around the world has also led to the consequent increase of network data measured and logged to maintain such connectivity. While such network data is key to enabling strong network performance across devices, the sheer volume of data poses several significant challenges for the entities responsible for processing and managing this data. One of the primary issues is data overload. With the constant stream of information from cellular networks, including call quality metrics, signal strength readings, user location data, and app usage statistics, the volume of data to be processed can become overwhelming. The volume of data not only strains storage capacities but also makes it increasingly difficult to efficiently extract relevant insights, which can subsequently lead to other problems, such as slow response times, long service outages for users, and/or the like. In places where consistent connectivity is important, such as in hospitals and schools, any loss of connectivity could yield significant negative results.

In particular, with so much data being collected, it becomes a daunting task for entities to sift through and identify what data is actually useful for improving network performance and user experience. For example, in cellular networks, while data on dropped calls and network congestion is crucial for maintaining service quality, not all collected data points may be relevant for addressing these issues. Additionally, the responsibility to maintain user privacy and data security becomes more complex with larger dataset. Entities dealing with this data must invest in robust security measures to protect sensitive information, which can be a significant financial and operational burden.

Accordingly, a mechanism is desired that would adaptively configure and reconfigure a set of network parameters based on perceived patterns in the processed data. For example, the system can dynamically expand the set of network parameters when anomalous values indicate a potential fault or may dynamically contract the set when values are at a status quo and/or when the expanded set of parameters are not needed. Such a system can also be enabled to learn new patterns of values that often lead to negative events such as fault events or system failure.

One mechanism to enable automatic reconfiguration of the network parameters utilizes machine learning. For example, an implementation of the disclosed system utilizes machine learning techniques to learn and recognize patterns of values of subsets of network performance parameters that are indicative of the occurrence of prospective fault events and reconfigure the network performance parameters to be processed. Responsive to recognizing a need for certain network performance parameters (e.g., to make measurements or calculations that are relevant to a particular fault event) the system can be reconfigured to expand the set of parameters processed. When a fault event is detected, or a pattern that is indicative of a fault event is detected, the system can transmit instructions for making a change to fix the problem or transmit notifications to operators to do the same.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (CNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown).

The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices include handheld mobile devices 104-1 and 104-2 (e.g., smartphones, portable hotspots, tablets, etc.);

laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
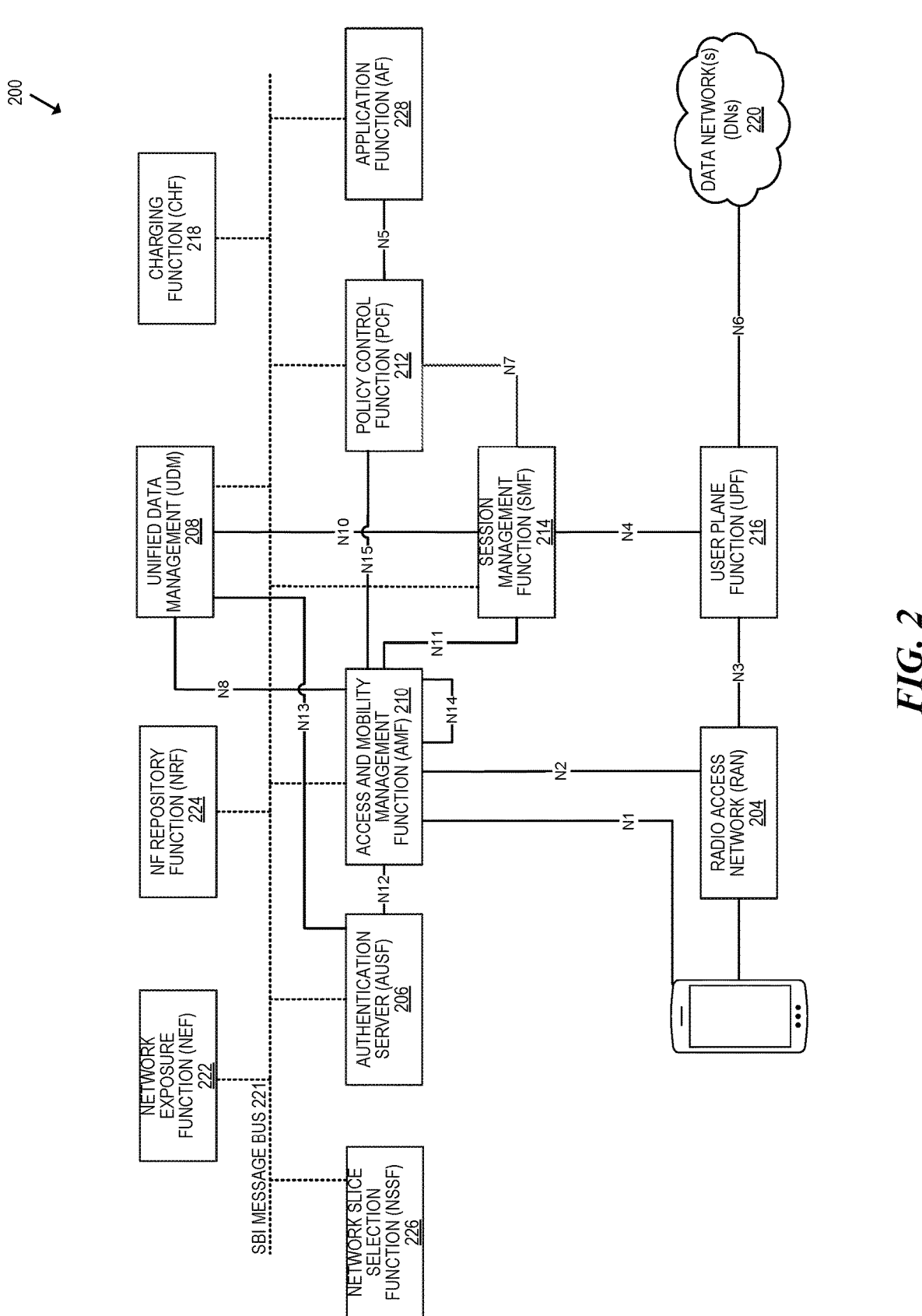
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Suitable Computing Environments

Figure 3A:
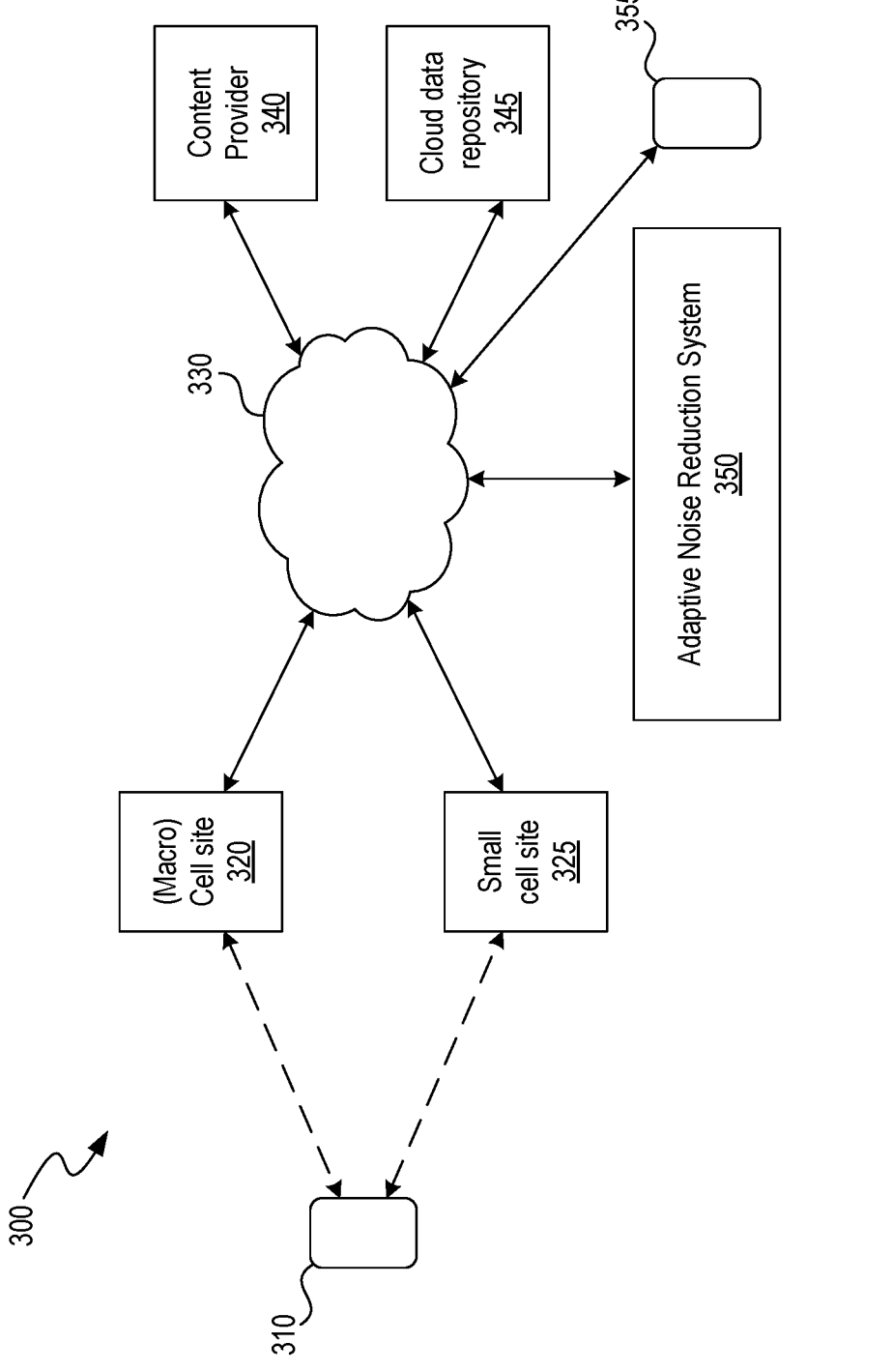
FIG. 3A is a block diagram illustrating a suitable computing environment within which to identify correlations for adaptive noise reduction.

FIG. 3A is a block diagram illustrating a suitable computing environment within which to identify correlations for adaptive noise reduction. As described herein, the computing environment 300 of FIG. 3A can identify patterns of underlying network parameters that are indicative of certain fault events. The system can be used to configure/reconfigure a set of network performance parameters (e.g., by expanding or contracting the set of parameters) to be processed and monitored to proactively predict and mitigate fault events. For example, the environment can monitor anomalous values or patterns of values and notify users (e.g., operators) when a prospective fault event is likely.

Computing environment 300 can include one or more user device(s) 310, one or more cell-sites 320 and 325, telecommunications network 330, content provider 340, cloud data repository 345, one or more other user devices 355, and adaptive noise reduction system 350. User device(s) 310, such as mobile devices or user equipment (UE) associated with users (such as mobile phones (e.g., smartphones), tablet computers, laptops, and so on), Internet of Things (IoT) devices, vehicles (e.g., smart vehicles), devices with sensors, and so on, can be configured to receive and transmit data, stream content, and/or perform other communications or receive services over a telecommunications network 330, which is accessed by the user device 310 over one or more cell sites 320, 325. For example, the mobile device 310 accesses a telecommunication network 330 via a cell site at a geographical location that includes the cell site, in order to transmit and receive data (e.g., stream or upload multimedia content) from various entities, such as a content provider 340, cloud data repository 345, and/or other user devices 355 on the network 330 and via the cell site 320.

The cell sites can include macro cell sites 320, such as base stations, small cell sites 325, such as picocells, microcells, or femtocells, and/or other network access component or sites. The cell cites 320, 325 can store data associated with their operations, including data associated with the number and types of connected users, data associated with the provision and/or utilization of a spectrum, radio band, frequency channel, and so on, provided by the cell sites 320, 325, and so on. The cell sites 320, 325 can monitor their use, such as the provisioning or utilization of physical resource blocks (PRBs) provided by a cell site physical layer in LTE network; likewise the cell sites can measure channel quality, such as via channel quality indicator (CQI) values, etc.

As described here, the system can be used to identify correlations for adaptive noise reduction by identifying patterns of network performance parameter values that are indicative of certain fault events. As referred to herein, fault events can include unwanted events that negatively affect network performance (e.g., connectivity). For example, fault events can include cell site outages (e.g., as a result of power outages, hardware failures, etc.), backhaul link failures, interference, equipment failure, overload or congestion, software bugs or glitches, security incidents, antenna misalignment, etc. In order to monitor for potential fault events, the environment can obtain and monitor values for specific network performance parameters (e.g., call drop rate, RSRP, etc.). For example, the computing environment 300 can obtain values for a set of network performance parameters by directly measuring them using sensors at the different components of environment 300 and/or calculating the network performance parameters using processors on the different components. The system can be used to reconfigure (e.g., by expanding or contracting) the set of network parameters for which the system is actively monitoring (e.g., by receiving and processing) values. The system can evaluate network performance on a component level or the environment level to determine potential issues in the environment.

For example, the system can obtain and monitor network performance parameters from sensors communicatively coupled to end-user devices (e.g., user device(s) 310 other devices 355), cell cites (e.g., base stations such as exemplary macro cell site 320 and small cell site 325), backhaul network components including (e.g., fiber, microwave (e.g., included in network 330) and/or core network components such as servers, routers, (e.g., content provider 340, cloud data repository 345, etc.).

For example, each of the components of environment 300 can provide different network performance parameters that can provide further insight as to the functionality of the component. The end-user devices can collect network performance parameters such as signal strength (e.g., Reference Signal Received Quality (RSRQ), Reference Signal Received Power (RSRP)), data throughput speeds (e.g., upload speeds, download speeds), connection quality metrics (e.g., latency, jitter, and packet loss experienced by end-user), device battery drain, and application performance metrics. The cell sites can be used to collect network performance parameters such as signal quality metrics (e.g., signal to noise ratio (SNR)), traffic load, handover rates, and/or parameters for equipment performance. The backhaul network components can collect network performance parameters such as throughput capacity, latency, jitter, link reliability, etc. The core network components can collect network utilization and capacity metrics, service availability (e.g., uptime and downtime statistics) and/or processing load metrics.

As described herein, the adaptive noise reduction system 350 can obtain (e.g., receive from a database or device, access from storage, receive via the network) values for a set of network performance parameters from one or more sensors at any of the devices within the environment. In particular, the adaptive noise reduction system 350 can receive values for a set of network performance parameters measured at discrete points in time over a period of time. For example, this can include a timeseries of values for each network performance parameters. Adaptive noise reduction system 350 can identify the timestamps that correspond to distinct fault events that negatively impact network performance.

The system can train a machine learning model using patterns of values of subsets prior to the fault event that are indicative of the occurrence of prospective fault events to be able to determine a next subset of network performance parameters to process and monitor. For example, if the machine learning model determines, based on the values of the network performance parameters, that the values indicate that there are no specific problems and that the values don't indicate any anomaly or potential for a fault event (e.g., based on prior patterns of values that ultimately led to a fault event), the machine learning model can output a smaller set of network performance parameters that the system should monitor, e.g., where the smaller set of network performance parameters is more representative of general performance of the network.

However, if the machine learning model determines that there might be a problem, such as based on identifying anomalous values of network performance parameters or detecting a pattern that led to a fault event in the past, the machine learning model can expand the set of network performance parameters to monitor and process to include those specific to potential fault events. Alternatively or additionally, the system can notify operators of potential fault events, current network performance parameters, and/or recommend actions to mitigate the potential for a fault event. The system can then reconfiguring the server to process values of network performance parameters of the next subset of network performance parameters.

In this way, the system can adaptively expand or contract the set of network performance parameters to conserve from unnecessary processing and storage of data. Doing so also enables operators and analysts to easy find patterns in data that lead to faults as the system removes unnecessary noise which can often confuse operators who don't understand the complexities, correlations, and dependencies between the parameters. Similarly, because the system utilizes machine learning, the system is better equipped to find patterns in data that can be challenging for operators to find. For example, ML algorithms are more effective at analyzing high-dimensional data and can also identify subtle and non-linear relationships in data. Especially in cases where consistent connectivity is needed, timely diagnosis of the underlying cause and identification of potential fixes is needed. In this regard, using machine learning systems to quickly analyze high volumes and dimensions of data can help provide consistent connectivity. Such a system can be used to predict faults before they even occur, to ensure connectivity to hospitals, emergency care workers, schools, and/or the like.

FIG. 3A and the discussion herein provide a brief, general description of a suitable computing environment 300 in which the adaptive noise reduction system 350 can be supported and implemented. Although not required, aspects of the adaptive noise reduction system 350 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device 310 and/or the cell sites 320, 325 can include network communication components that enable the devices to communicate with remote servers or other portable electronic devices by transmitting and receiving wireless signals using a licensed, semi-licensed, or unlicensed spectrum over communications network, such as telecommunications network 330. In some cases, the telecommunications network 330 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 330 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/ EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the adaptive noise reduction system 350 will now be described.

Examples of Adaptive Noise Reduction

Figure 3B:
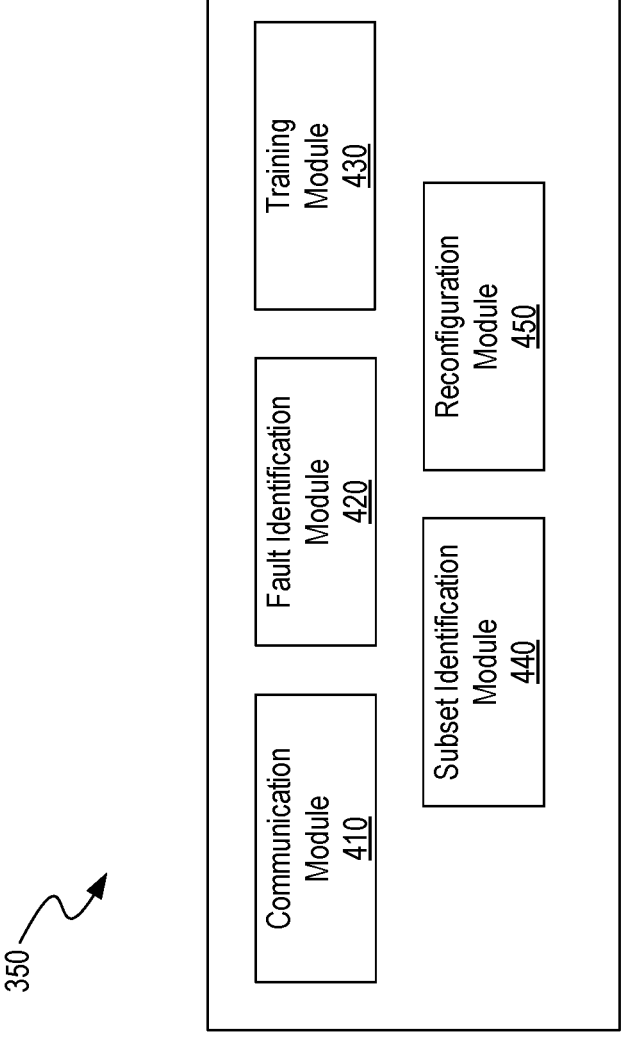
FIG. 3B is a block diagram illustrating the components of an exemplary adaptive noise reduction system.

FIG. 3B is a block diagram illustrating the components of an adaptive noise reduction system 350. The adaptive noise reduction system 350 can include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the specific functions described herein. For example, the adaptive noise reduction system 350 includes a communication module 410, a fault identification module 420, a training module 430, a subset identification module 440, and a reconfiguration module 450, each of which is discussed separately below.

Communication Module

Communication module 410 of adaptive noise reduction system 350 can include software and/or hardware components allowing for the transmission and/or receipt of information between two or more devices. Communication module 410 can include a wireless communication module, such as a cellular radio or Wi-Fi antenna, to allow for communication over wireless networks, and/or can additionally or alternatively include a network card (e.g., a wireless network card and/or a wired network card) that is associated with software to drive the card.

The communication module 410 is configured and/or programmed (e.g., via the above-mentioned techniques) to interface between a device (e.g., user device(s) 310, one or more other user devices 355), cell sites (e.g., cell sites 320, 325), content provider (e.g., content provider 340), cloud data repository (e.g., cloud data repository 345) such as via a network (e.g., network 330), to receive and transmit data including values (e.g., time-series) for a set of network performance parameters. When communication module 410 receives data, the module can pass on relevant portions of data to different modules of the adaptive noise reduction system 350. Communication module 410 also be configured to generate and transmit notifications and/or recommendations to operators, and in some cases, transmit commands to different devices to reconfigure the set of network performance parameters being received (e.g., to stop the sensors from producing the values, to stop the devices from calculating or measuring the values, or to stop the devices from sending the values).

As described herein, communication module 410 can receive values for a set of network performance values. In particular, communication module 410 can obtain a first set of network performance metrics measured during a first period of time from a sensor module, where the sensor module may include sensors deployed at any of one or more remote devices. For example, any of the components of the environment 300, including user device(s) 310 other devices 355, cell cites (e.g., base stations such as exemplary macro cell site 320 and small cell site 325), backhaul network components included in network 330 (e.g., fiber, microwave, etc.) and/or core network components such as servers, routers, (e.g., content provider 340, cloud data repository 345, etc.) can be enabled (e.g., via sensors on the devices, or processors on the devices) to measure, calculate, or otherwise obtain values for various network performance parameters, also referred to herein as metrics.

For example, the network performance parameters can include signal strength (e.g., RSSI, RSRP, RSRQ), data throughput speeds (upload, download speeds), connection quality metrics (e.g., latency, jitter, and packet loss experienced by end-user), device battery drain, application performance metrics, signal quality metrics (e.g., signal to noise ratio (SNR)), traffic load, handover rates, throughput capacity, latency, jitter, link reliability, network utilization and capacity metrics, service availability (e.g., uptime and downtime statistics) and/or processing load metrics.

Figure 4:
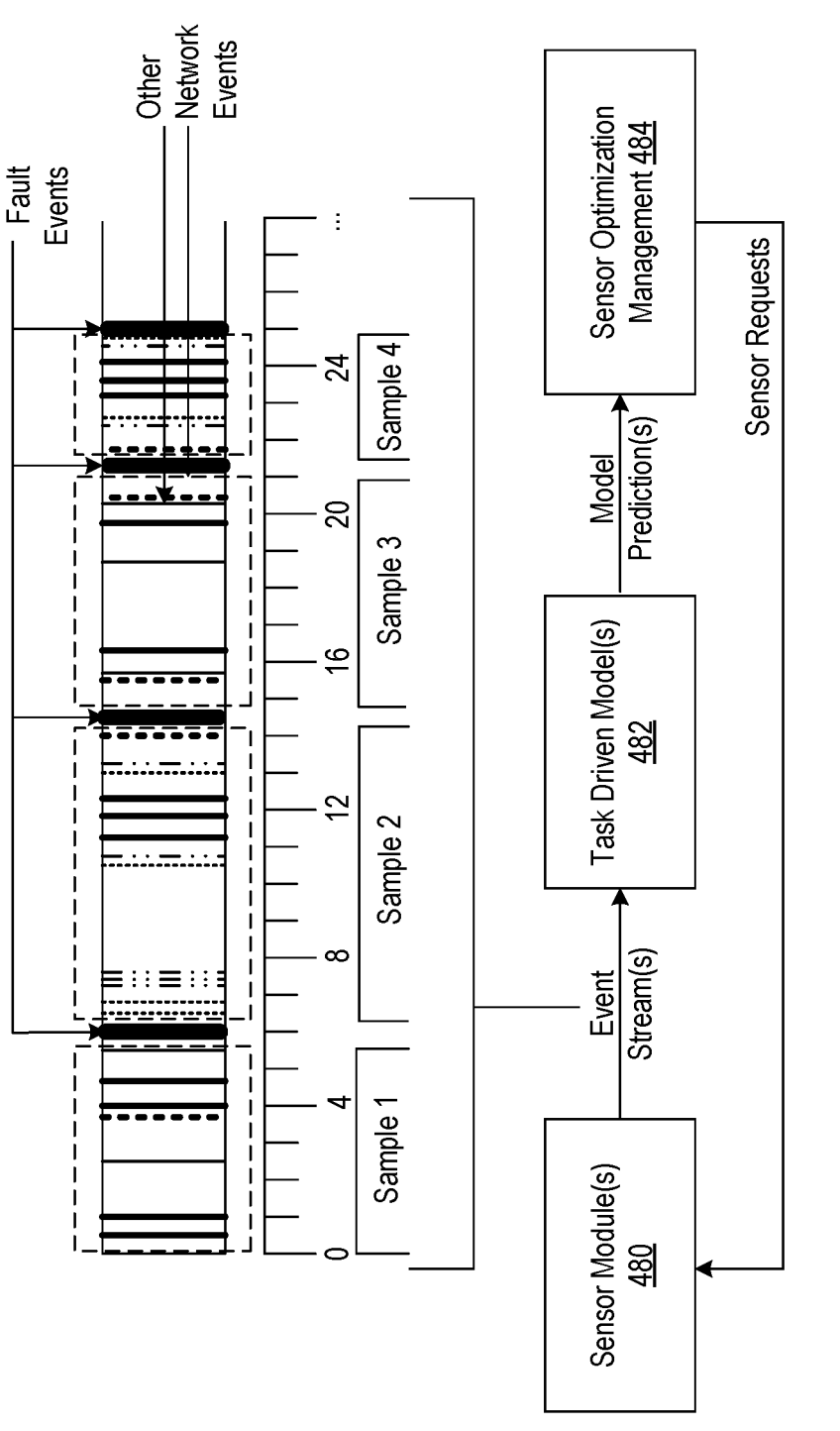
FIG. 4 is a block diagram illustrating event streams used in a workflow for an adaptive noise reduction system.

FIG. 4 is a block diagram illustrating event streams used in a workflow for an adaptive noise reduction system. For example, as illustrated in FIG. 4, the sensor module(s) 480 may output event stream(s) that comprise network events such as traffic spikes, connectivity changes, configuration changes, security incidents, performance issues, hardware/ software malfunction, etc. The event stream may indicate the values of different network performance parameters in time periods prior to each fault. For example, "Sample 1", "Sample 2", "Sample 3", and "Sample 4" are exemplary time periods that show network events over time.

In some examples, the received data structures (e.g., files, records, data packets) can also include network coverage data associated with specific reference points, RF signals, distance between the user equipment (e.g., mobile device) and at least one telecommunications network site (e.g., cell cites), strength of signal received by the user equipment, quantity of data used by the mobile device, type of mobile device, a mode of transportation, a telecommunications service provider associated with the user equipment or any combination thereof.

The communication module can pass the values of the network performance parameters, or a pointer to the data in memory, to other modules in the adaptive noise reduction system 350, e.g., to train a machine learning model using patterns of values of subsets of network performance parameters that are indicative of the occurrence of prospective fault events. The trained machine learning model can then be used to identify a different set of network performance parameters to monitor based on the values of network performance parameters obtained from a previous time frame.

In some cases, in order to reconfigure the set of network performance parameters to monitor, the communication module 410 can be used to transmit commands to the corresponding components of the environment 300. For example, the commands can include commands to effectuate activation or deactivation of sensors, e.g., at remote devices to enable measurement or disable measurement of certain metrics. In another example, the commands can include instructions to stop transmitting, measuring, and/or calculating certain parameters or metrics. Additionally, in some examples, the system can identify and notify operators of potential fault events, current network performance parameters, and/or recommended actions to mitigate the potential for a fault event. The communication module 410 can transmit notifications, current network performance parameters and/or the recommended actions to devices of operators.

In some examples, the actions can include an action for modifying a value of an operational parameter at a cell tower to prevent or mitigate the one or more prospective fault events and the method further comprises generating a command for modifying the value. Similarly, the actions can include actions for modifying one or more of transmission power, frequency bands, channel allocation, antenna tile, beamforming parameters, network configuration settings, software updates and patches, and/or access control lists.

Subset Identification Module and Reconfiguration Module

The subset identification module 440 can obtain values for the set of network performance parameters, e.g., from the communication module 410 and input them into a machine learning model to identify the next set of parameters (e.g., metrics) to process in the next period of time. In particular, the subset identification module 440 may input the first set of network performance metrics into a machine learning model to obtain an optimal set of network performance metrics to be measured during a second period of time. The subset identification module 440 may identify, based on the optimal set of network performance metrics, a second set of sensors for deployment.

For example, the subset identification module may receive values for network performance parameters including jitter and error rate over a first period of time. The module may then input the values into a model trained via training module 430. The machine learning model, for example, can detect one or more anomalous values of a previous set of metrics and identify a new, optimal set of metrics to measure. Based on the new set of metrics to measure over a next period of time, specific sensors needed to measure or calculate those metrics are identified.

In the example of FIG. 4, the sensor module(s) 480 may output event stream(s) that comprise network events (e.g., traffic spikes, connectivity changes, configuration changes, security incidents, performance issues, hardware/software malfunction, etc.) The event stream may indicate the values of different network performance parameters. The task-driven model 482 of FIG. 4 can be the machine learning model configured to identify anomalies in the values of the network performance metrics over time.

The model prediction(s) that indicate the next set of network performance parameters to measure using sensor optimization management 484 (e.g., reconfiguration module 450). The reconfiguration module 450 can then generate commands (e.g., transmitted by the communication module 410) for different devices to reconfigure the set of network performance parameters being received (e.g., to stop the sensors from producing the values, to stop the devices from calculating or measuring the values, or to stop the devices from sending the values). In some examples, the command may include requests for specific sensor values or measurements.

In some examples, the reconfiguration module 450 may transmit a command to a sensor module. In some examples, the sensor module may further transmit commands to each of the remote devices comprising each of one or more sensors. For example, the command may identify the sensors that should be active in order to measure the optimal network performance parameters. The sensor module or the remote devices may determine which sensors to activate or deactivate in order to measure using the sensors of the second set.

Alternatively or additionally, the system may determine the difference between the first and second sets of sensors to be active, and may transmit a command indicative of the difference between the two. For example, reconfiguration module 450 may identify a first subset of sensors from the first set of sensors that were active during the first period of times and not part of the second set of sensors and generate a command for deactivating the first subset of sensors. Similarly, the reconfiguration module may identify a second subset of sensors from the second set of sensors that are not part of the first set of sensors and generate a command for activating the second subset of sensors.

Fault Identification Module

As described herein, the system can be configured to identify potential fault events based on anomalous values of the network performance parameters. For example, fault identification module 420 of adaptive noise reduction system 350 can be used to identify faults based on network performance data passed from the communication module 410. For example, fault identification can include identifying, for a period of time, one or more timestamps that correspond to distinct fault events that negatively impact network performance. The identification can occur automatically, such as by determining that a value exceeds or fails to exceed a threshold, or the identification can occur manually, such as by an operator or based on a user's input (e.g., a user transmits an indication that their connectivity is bad).

As described, the identification of the fault can be done manually. For example, the fault identification module 420 can prompt a user such as an operator or an end-user (e.g., at user device(s) 310), to identify whether a timeseries indicates a fault. For example, the system can prompt the user via their device to respond as to whether or not there was a fault event, or whether the values correspond to a fault event.

Alternatively or additionally, the fault identification module 420 can, as described, the identification of the fault can occur automatically. In one example, the fault identification module 420 can receive, via the communication module 410, values for call drop rate from several devices over a period of time. The fault identification module 420 can parse through values of the timeseries for call drop rate and identify a fault based on the value of call drop rate exceeding a threshold value for call drop rate. In some examples, the fault identification module 420 can also consider the duration or frequency within the period of time for which the call drop rate exceeds the threshold. For example, the fault identification module 420 can consider that the call drop rate exceeds 60% for 50% of the time period, or can consider that the call drop rate exceed 60% over 5 times in the period of time. In some examples, the threshold period of time, the threshold frequency, and/or the threshold value can be pre-determined based on an operator's input.

In another example, the identification of the fault can be done automatically by the system using a machine learning model. For example, the system can include a machine learning model (e.g., as discussed in relation with the training module 430) that is trained on timeseries of values of network parameters that are labeled with a fault event or lack of a fault event. In particular, the system can receive labelled data in a first instance and use the labelled data to train the machine learning model. The system can then automatically detect fault events using the trained machine learning model.

The fault identification module 420 can also identify values for the set of network performance parameters prior to the timestamps corresponding to the plurality of distinct fault events. For example, the fault identification module 420 can identify a power failure event at 4:22:34 PM and a network congestion event at 2:14:21 PM. The fault identification module can identify the values of the network parameters from an hour prior up to the fault events for further analysis by the machine learning module 430. The timestamps of the fault events, the values prior to the fault events, and/or a pointer to the same can be transmitted to the training module and/or the subset identification module.
Training Module As described above, one or more machine learning models can be trained to determine a next subset of network performance parameters to process based on values of network performance parameters as well as to predict the occurrence of prospective fault events.

For example, a first machine learning model can be trained to predict the occurrence of prospective fault events using patterns of values for network performance parameters. Training module 430 can train the machine learning model using a training set received at communication module 410 or using a training set generated using fault identification module 420. In one example, the training module 430 can receive a training set from communication module 410 for training the machine learning model. The training set can include a combination of data including, a timeseries of network parameter values, an identified timestamp for a labelled fault event or anomaly, a subset of network parameter values to consider upon occurrence of an anomaly, and/or one or more actions to perform upon occurrence of an anomaly or fault event. The one or more actions can include commands to a device to modify parameters, commands to transmit a notification or recommendation to an operator, and/or the like.

In another example, the machine learning model can be trained using a training set generated using fault identification module 420. For example, the model can use the identified fault events and the values of the network parameters prior to the fault to train the machine learning model.

11:25 PM. The latency is unaffected in this example. The training data can use this sample to inform the ultimate weight it gives to different parameters in identifying when a fault event can occur. In particular, as the model is trained, the machine learning model can learn the optimal weights and thresholds so that the model can determine that one or more prospective fault events are likely to occur (e.g., based on if the values exceed pre-determined thresholds determined by the weights corresponding to one or more prospective fault events). The model weights of the trained model can be stored and executed locally or stored on a separate server.

According to some embodiments, the machine learning model can further be trained to identify, when a prospective fault event can occur, what actions to perform. For example, the system can transmit a notification to the operator or transmit commands to change operational parameters, and/or the like.

Similarly, as described herein, a second machine learning model can be trained to determine a next subset of network performance parameters to process based on prior values of network performance parameters. For example, the machine learning model can be trained to expand or constrict network performance parameters when certain values or patterns of values occur in the network performance parameters.

The model can be trained using a labelled training set obtained via the communication module 410. The training set can include values for a first subset of network parameters and the subsequent subset selected to be processed in a next time frame. Alternatively or additionally, as described earlier, the model can be trained using the data obtained via the fault identification module 420. For example, the machine learning model can be trained using a training set generated using fault identification module 420. For example, the model can use the identified fault events and the values of the network parameters prior to the fault to train the machine learning model.

In one example, the first and second machine learning model can be the same machine learning model and can include an adaptive machine learning model. The model can be designed to dynamically adjust its behavior or decision-making based on the input data it receives. In this case, the machine learning model can be continuously trained to decide the kinds of data (e.g., which network parameters) it needs to consider next based on the values of the current data (e.g., the current set of network parameters). This adaptability allows the model to optimize its performance in real-time.
Flow Diagram

TABLE 1

| Timestamp | 11:22PM | 11:23PM | 11:24PM | 11:25PM | 11:26PM | 11:27PM | 11:28PM |
|---|---|---|---|---|---|---|---|
| RSRP | −65 dBm | −86 dBm | −134 dBm | −135 dBm | −222 dBm | −137 dBm | −188 dBm |
| Call Drop | 2% | 2% | 1.2% | 50% | 70% | 40% | 34% |
| SNR | 25 dB | 33 dB | 23 dB | 32 dB | 0 dB | 0 dB | 0 dB |
| Latency | 2.3 s | 2.2 s | 2.1 s | 2.2 s | 2.3 s | 2.2 s | 2.2 s |

Table 1 shows exemplary values of some network parameters over a period of time (e.g., 11:22 PM-11:28 PM) that can be used as a sample of training data for training the machine learning model. The training data can include the time of the fault event, which occurred in this example at 11:28 PM, as well as the subset of network parameter values for consideration. In the example of Table 1, the RSRP values get significantly worse at 11:24 PM, while SNR doesn't drop until 11:26 PM and call drop rates increase at FIG. 5 is a flow diagram illustrating a process for identifying correlations for adaptive noise reduction. Process 500 begins at block 502 where a system (e.g., such as adaptive noise reduction system 350) obtains a first set of network performance metrics measured during a first period of time from a sensor module (as discussed above in reference to the communication module 410). At block 504, process 500 includes inputting the first set of network performance metrics into a machine learning model to obtain an optimal set of network performance metrics to be measured during a second period of time. Process 500 then proceeds to block 506 where a system identifies, based on the optimal set of network performance metrics, a second set of sensors for usage/to collect data from.

At block 508, process 500 generates one or more commands configured to effectuate activation of sensors of the second set of sensors, and deactivation of one or more sensors in the sensor module not comprised in the second set of sensors. The process proceeds to block 510, where the system transmits the one or more commands to one or more remote devices coupled to the sensor module.

Computer System

Figure 6:
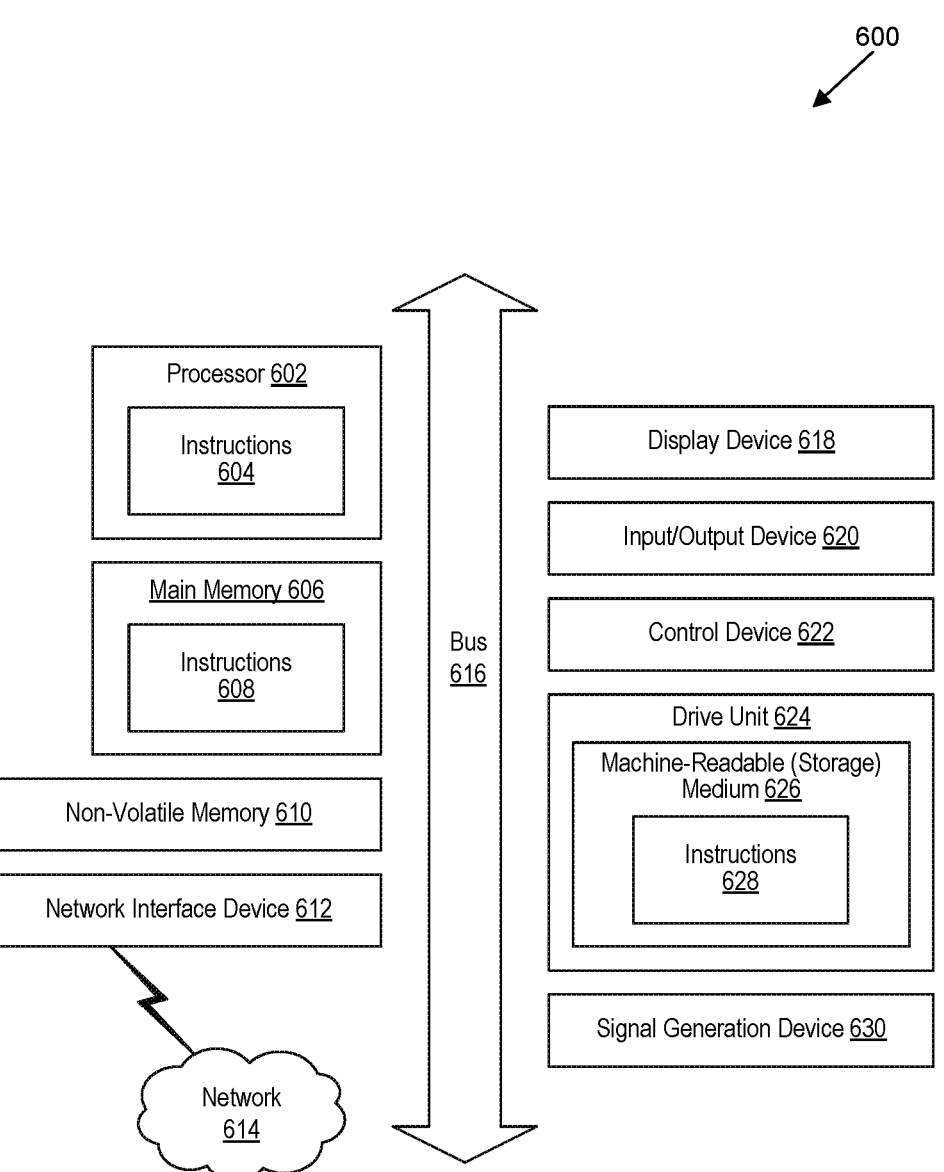
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 shares a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation.

The applicant reserves the right to pursue such additional claim forms in either this application or in a continuing application.

We claim:

1. A computer-implemented method for identifying correlations for adaptive noise reduction, the method comprising:

obtaining values for a first set of network performance metrics measured during a first period of time from a sensor module communicatively coupled to a first set of sensors deployed at one or more remote devices of a telecommunications network;

inputting values for the first set of network performance metrics into a machine learning model to obtain an optimal set of network performance metrics to be measured during a future period of time, wherein the machine learning model is configured to determine a next set of metrics to be measured based on detection of one or more anomalous values of a previous set of metrics, and wherein the optimal set comprises an expanded set of metrics comprising an additional metric from the first set of network performance metrics;

identifying, based on the optimal set of network performance metrics to be measured during the future period of time, a second set of sensors for usage by determining one or more additional sensors needed to measure or calculate the expanded set of metrics of the optimal set, wherein the one or more additional sensors correspond to potential fault events at the telecommunications network;

generating one or more commands configured to effectuate activation of one or more sensors of the second set of sensors, and deactivation of one or more sensors of the first set of sensors, wherein at least one sensor of the first set of sensors is different than at least one sensor of the second set of sensors; and transmitting, to one or more remote devices communicatively coupled to the sensor module, the one or more commands effectuating activation of the one or more sensors of the second set of sensors and deactivation of the one or more sensors of the first set of sensors.

2. The method of claim 1, wherein generating the one or more commands comprises:

identifying a first subset of sensors from the first set of sensors that were active during the first period of times and not part of the second set of sensors; and generating one or more commands for deactivating the first subset of sensors.

3. The method of claim 1, wherein generating the one or more commands comprises:

identifying a second subset of sensors from the second set of sensors that are not part of the first set of sensors; and generating one or more commands for activating the second subset of sensors.

4. The method of claim 1, wherein the method further comprises:

receiving, from one or more sensors at the one or more remote devices, values for the optimal set of network performance metrics measured over a second period of time occurring after the first period of time;

determining, based on the values for the optimal set of network performance metrics, that one or more prospective fault events are likely to occur; and transmitting, to a remote device, a notification for performing one or more actions to prevent or mitigate the one or more prospective fault events.

5. The method of claim 4, wherein determining that one or more prospective fault events are likely to occur comprises inputting the values over a period of time into a second machine learning model and wherein the method further comprises training a second machine learning model for predicting occurrence of prospective fault events based on values of the network performance metrics over a period of time.

6. The method of claim 4, wherein determining that one or more prospective fault events are likely to occur based on values over a period of time comprises determining whether values over the period of time exceed pre-determined thresholds corresponding to one or more prospective fault events.

7. The method of claim 4, further comprising, responsive to determining that one or more prospective fault events are likely to occur, identifying one or more actions to be performed at a remote device or server to prevent or mitigate the one or more prospective fault events.

8. The method of claim 7, wherein the one or more actions comprises modifying a value of an operational parameter at a cell tower to prevent or mitigate the one or more prospective fault events and the method further comprises generating a command for modifying the value.

9. One or more non-transitory computer-readable media containing instructions which when executed by a processor, perform a method for identifying correlations for adaptive noise reduction, the method comprising:

obtaining values for a first set of network performance metrics measured during a first period of time from a sensor module communicatively coupled to a first set of sensors deployed at one or more remote devices of a telecommunications network;

inputting values for the first set of network performance metrics into a machine learning model to obtain an optimal set of network performance metrics to be measured during a future period of time, wherein the machine learning model is configured to determine a next set of metrics to be measured based on detection of one or more anomalous values of a previous set of metrics, and wherein the optimal set comprises an expanded set of metrics comprising an additional metric from the first set of network performance metrics;

identifying, based on the optimal set of network performance metrics to be measured during the future period of time, a second set of sensors for usage by determining one or more additional sensors needed to measure or calculate the expanded set of metrics of the optimal set, wherein the one or more additional sensors correspond to potential fault events at the telecommunications network; and generating one or more commands configured to effectuate activation of one or more sensors of the second set of sensors, and deactivation of one or more sensors of the first set of sensors, wherein at least one sensor of the first set of sensors is different than at least one sensor of the second set of sensors.

10. The one or more non-transitory computer-readable media of claim 9, wherein generating the one or more commands comprises:

identifying a first subset of sensors from the first set of sensors that were active during the first period of times and not part of the second set of sensors; and generating one or more commands for deactivating the first subset of sensors.

11. The one or more non-transitory computer-readable media of claim 9, wherein generating the one or more commands comprises:

identifying a second subset of sensors from the second set of sensors that are not part of the first set of sensors; and generating one or more commands for activating the second subset of sensors.

12. The one or more non-transitory computer-readable media of claim 10, wherein the method further comprises:

receiving, from one or more sensors at the one or more remote devices, values for the optimal set of network performance metrics measured over a second period of time occurring after the first period of time;

determining, based on the values for the optimal set of network performance metrics, that one or more prospective fault events are likely to occur; and transmitting, to a remote device, a notification for performing one or more actions to prevent or mitigate the one or more prospective fault events.

13. The one or more non-transitory computer-readable media of claim 12, wherein determining that one or more prospective fault events are likely to occur comprises inputting the values over a period of time into a second machine learning model and wherein the method further comprises training a second machine learning model for predicting occurrence of prospective fault events based on values of network performance metrics over a period of time.

14. The one or more non-transitory computer-readable media of claim 12, wherein determining that one or more prospective fault events are likely to occur based on values over a period of time comprises determining whether values over the period of time exceed pre-determined thresholds corresponding to one or more prospective fault events.

15. The one or more non-transitory computer-readable media of claim 14, further comprising, responsive to determining that one or more prospective fault events are likely to occur, identifying one or more actions to be performed at a remote device or server to prevent or mitigate the one or more prospective fault events.

16. A system for identifying correlations for adaptive noise reduction, the system comprising:

one or more processors; and one or more non-transitory computer-readable media storing instructions that, when executed by the one or more processors, cause operations comprising:

obtaining values for a first set of network performance metrics measured during a first period of time from a sensor module communicatively coupled to a first set of sensors deployed at one or more remote devices of a telecommunications network;

inputting values for the first set of network performance metrics into a machine learning model to obtain an optimal set of network performance metrics to be measured during a future period of time, wherein the machine learning model is configured to determine a next set of metrics to be measured based on detection of one or more anomalous values of a previous set of metrics, and wherein the optimal set comprises an expanded set of metrics comprising an additional metric from the first set of network performance metrics;

identifying, based on the optimal set of network performance metrics to be measured during the future period of time, a second set of sensors for usage by determining one or more additional sensors needed to measure or calculate the expanded set of metrics of the optimal set, wherein the one or more additional sensors correspond to potential fault events at the telecommunications network;

generating one or more commands configured to effectuate activation of one or more sensors of the second set of sensors, and deactivation of one or more sensors of the first set of sensors, wherein at least one sensor of the first set of sensors is different than at least one sensor of the second set of sensors; and transmitting, to one or more remote devices communicatively coupled to the sensor module, the one or more commands effectuating activation of the one or more sensors of the second set of sensors and deactivation of the one or more sensors of the first set of sensors.

17. The system of claim 16, wherein determining that one or more prospective fault events are likely to occur comprises inputting the values over a period of time into a second machine learning model and operations further comprise training the second machine learning model for predicting occurrence of prospective fault events based on values of the network performance metrics over a period of time.

18. The system of claim 17, wherein determining that one or more prospective fault events are likely to occur based on values over a period of time comprises determining whether values over the period of time exceed pre-determined thresholds corresponding to one or more prospective fault events.

19. The system of claim 18, wherein the one or more non-transitory computer-readable media further cause operations comprising:

responsive to determining that one or more prospective fault events are likely to occur, identifying one or more actions to be performed at a remote device or server to prevent or mitigate the one or more prospective fault events.

20. The system of claim 18, wherein the one or more non-transitory computer-readable media further cause operations comprising:

identifying a first subset of sensors from the first set of sensors that were active during the first period of times and not part of the second set of sensors; and generating a command for deactivating the first subset of sensors.

* * * * *